United States Patent [19]
Cha et al.

[11] Patent Number: 6,105,444
[45] Date of Patent: Aug. 22, 2000

[54] NOISE TESTER FOR AN INDOOR UNIT OF AN AIR CONDITIONER

[75] Inventors: Jae-jin Cha; Doo-nam Myung, both of Suwon, Rep. of Korea

[73] Assignee: Samsung Electronics Co., Ltd., Suwon, Rep. of Korea

[21] Appl. No.: 09/152,065

[22] Filed: Sep. 11, 1998

[30] Foreign Application Priority Data

Apr. 11, 1998 [KR] Rep. of Korea ................... 98-12956

[51] Int. Cl.[7] ................................................ G01L 25/00
[52] U.S. Cl. ............................................................ 73/865.8
[58] Field of Search ........................... 73/571, 587, 593, 73/432.1, 865.6, 865.8, 865.9; 702/118, 121, 122, 123; 62/125, 127; 198/339.1

[56] References Cited

U.S. PATENT DOCUMENTS

| | | | |
|---|---|---|---|
| 5,042,265 | 8/1991 | Baldwin et al. | 62/127 |
| 5,203,178 | 4/1993 | Shyu | 62/180 |
| 5,457,750 | 10/1995 | Ahn | 381/71 |
| 5,495,722 | 3/1996 | Manson et al. | 62/125 |
| 5,824,921 | 10/1998 | Kanai | 73/865.8 |
| 6,038,521 | 3/2000 | Kanai | 73/865.8 |

*Primary Examiner*—Hezron Williams
*Assistant Examiner*—Rose M. Miller
*Attorney, Agent, or Firm*—Burns, Doane, Swecker & Mathis, L.L.P.

[57] ABSTRACT

A noise tester for testing an operating noise level of an indoor air conditioner includes a casing which is installed between an assembly line for assembling the air conditioner unit, and a packing line for packing the assembled unit. The casing includes a bottom section and a cover removably mounted on the bottom section for opening the casing and permitting a unit to be introduced therein. A receiving part is disposed in the bottom section for receiving a unit from the assembly line when the cover is open, and for transferring the unit to the packing line after the testing has been performed. A test mechanism is provided for testing and operating noise level of a unit disposed in the casing with the cover closed. The test mechanism includes a microphone disposed within the casing.

14 Claims, 5 Drawing Sheets

NOISE TESTER FOR AN INDOOR UNIT OF AN AIR CONDITIONER

BACKGROUND OF THE INVENTION

1. Field of the Invention

The present invention relates to an assembly line for making an indoor unit of a dual-unit type air conditioner, and more particularly, to a noise tester for testing a level of noise of an assembled indoor unit.

2. Description of the Prior Art

Generally, an indoor unit of a dual-unit type air conditioner is assembled on an assembly line. Then, the assembled indoor unit undergoes quality tests such as a withstand voltage test, noise test, or the like, and then is packed and shipped.

As shown in FIG. 1, the noise test is performed in an inspection chamber 4 which encloses a conveyor line 2 installed between an assembly line 1 and a packing line 3. In the inspection chamber 4, an examiner E determines whether the level of noise generated from the product is acceptable or not by listening to the functioning air conditioner.

However, such a method for testing noise has problems as follows.

First, since the inspection chamber 4 encloses the conveyor line 2, it occupies a large installation space, and is not suitable for producing a variety of products in small quantities.

Moreover, since the assembly line of the indoor unit has about the same height as the examiner's waist, the examiner has to bend his/her body to get his ear close to the indoor unit in order to hear the noise generated therefrom. Accordingly, the examiner becomes fatigued having to repeatedly bend at his/her waist.

SUMMARY OF THE INVENTION

The present invention is intended to overcome the above problems, and accordingly it is an object of the present invention to provide a noise tester for an indoor unit of an air conditioner occupying only a small amount of installation space.

Another object of the present invention is to provide a noise tester which does not require an examiner to bend his/her body, whereby testing efficiency is increased.

To achieve the above objects, the present invention involves a noise tester for testing and operating noise level of an indoor air conditioner unit. The tester comprises a casing, a receiving part, and a test mechanism. The casing is installed between an assembly line for assembling indoor air conditioner units and a packing line for packing the assembled units. The casing includes a bottom section and a cover removably mounted on the bottom section for being raised to open the casing and permit a unit to be introduced therein. The receiving part is disposed in the bottom section for receiving a unit from the assembly line when the cover is open, and for transferring the unit to the packing line. The test mechanism tests an operating noise level of a unit disposed in the casing with the cover closed.

The noise testing mechanism preferably comprises a microphone for sensing the noise of the indoor unit received in the receiving part, and a headphone for transmitting the noise sensed by the microphone to an examiner. It is preferable that an amplifier for amplifying the noise sensed by the microphone be disposed between the microphone and the headphone.

Furthermore, it is possible that the noise testing mechanism comprises a microphone for sensing the noise of the indoor unit received in the receiving part, a microcomputer for rating the level of the noise sensed by the microphone, and an indicator for indicating a result produced from the microcomputer.

Preferably, the receiving part can be inclined by an actuator during the testing operation at an angle of forty to sixty degrees.

Thus, as the indoor units assembled in the assembly line are received by the receiving part, the cover of the casing is closed and the receiving part is inclined so that the indoor unit thereon is put in a similar condition where the indoor unit is used. At this situation, the level of the noise generated from the indoor unit is rated. The examiner wears headphones so as to determine whether the level of the noise is acceptable or not, or the microcomputer rates the same and indicates the result through the indication section. After the noise testing process, the receiving part is returned to horizontal. Then the cover of the casing is opened, and indoor unit is conveyed to the packing line.

The noise tester according to the present invention can be relatively small, so it is suitable for a small-sized assembly line for producing a variety of products in small quantities. In addition, a withstand voltage testing section may be included into the noise tester so that the space required for quality testing is greatly reduced.

Also, since the examiner performs the noise testing process without much movement, fatigue is reduced.

BRIEF DESCRIPTION OF THE DRAWINGS

Above object and advantage will be more apparent by describing the present invention with reference to the reference drawing accompanied, in which.

DETAILED DESCRIPTION OF THE PREFERRED EMBODIMENT

Figure 1:
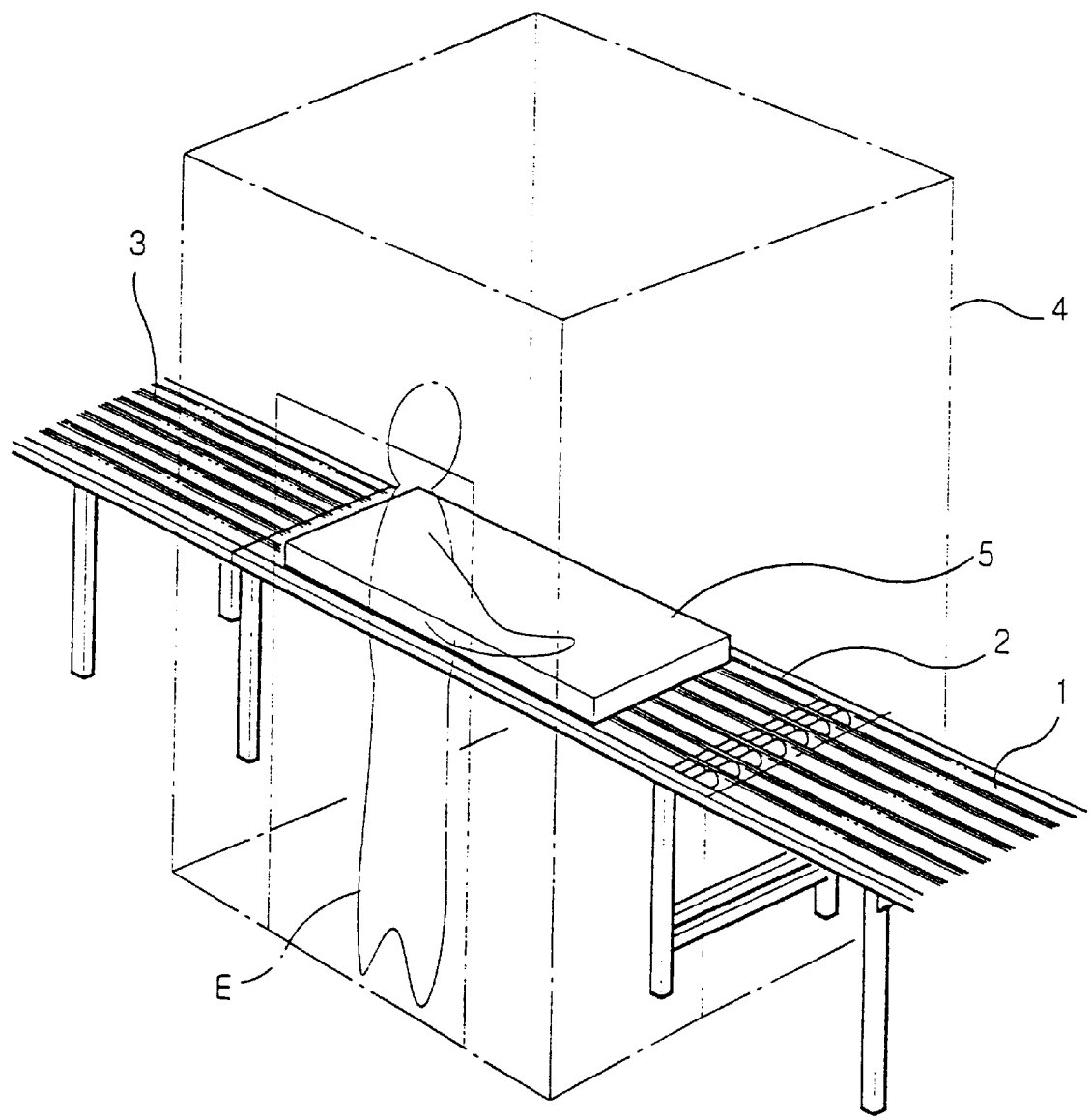
FIG. 1 is a perspective view showing a conventional inspection chamber in which a noise test of an indoor unit of a dual-unit type air conditioner is performed.
Figure 2:
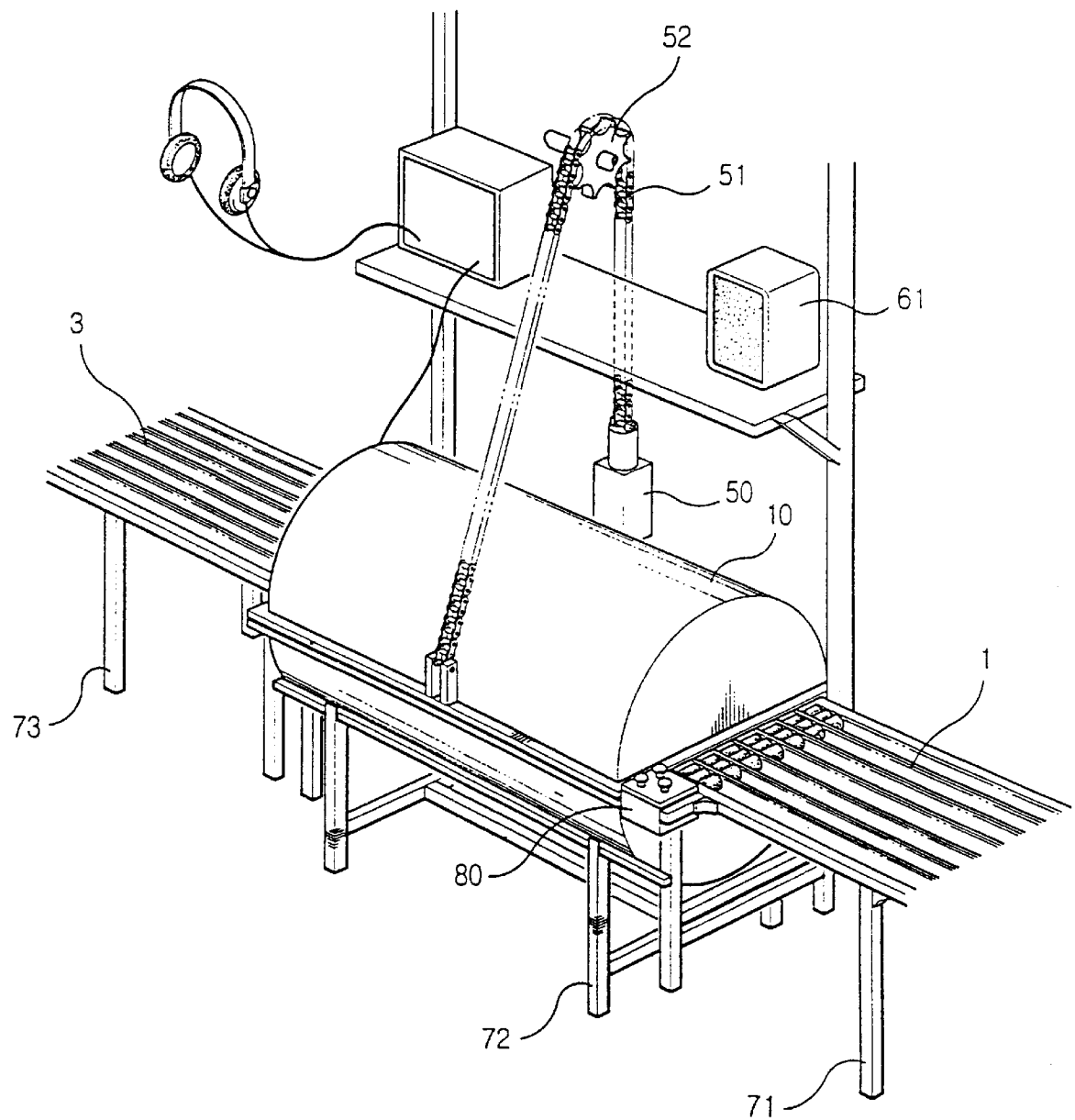
FIG. 2 is a perspective view showing a noise tester according to the preferred embodiment of the present invention, wherein the cover is closed.
Figure 3:
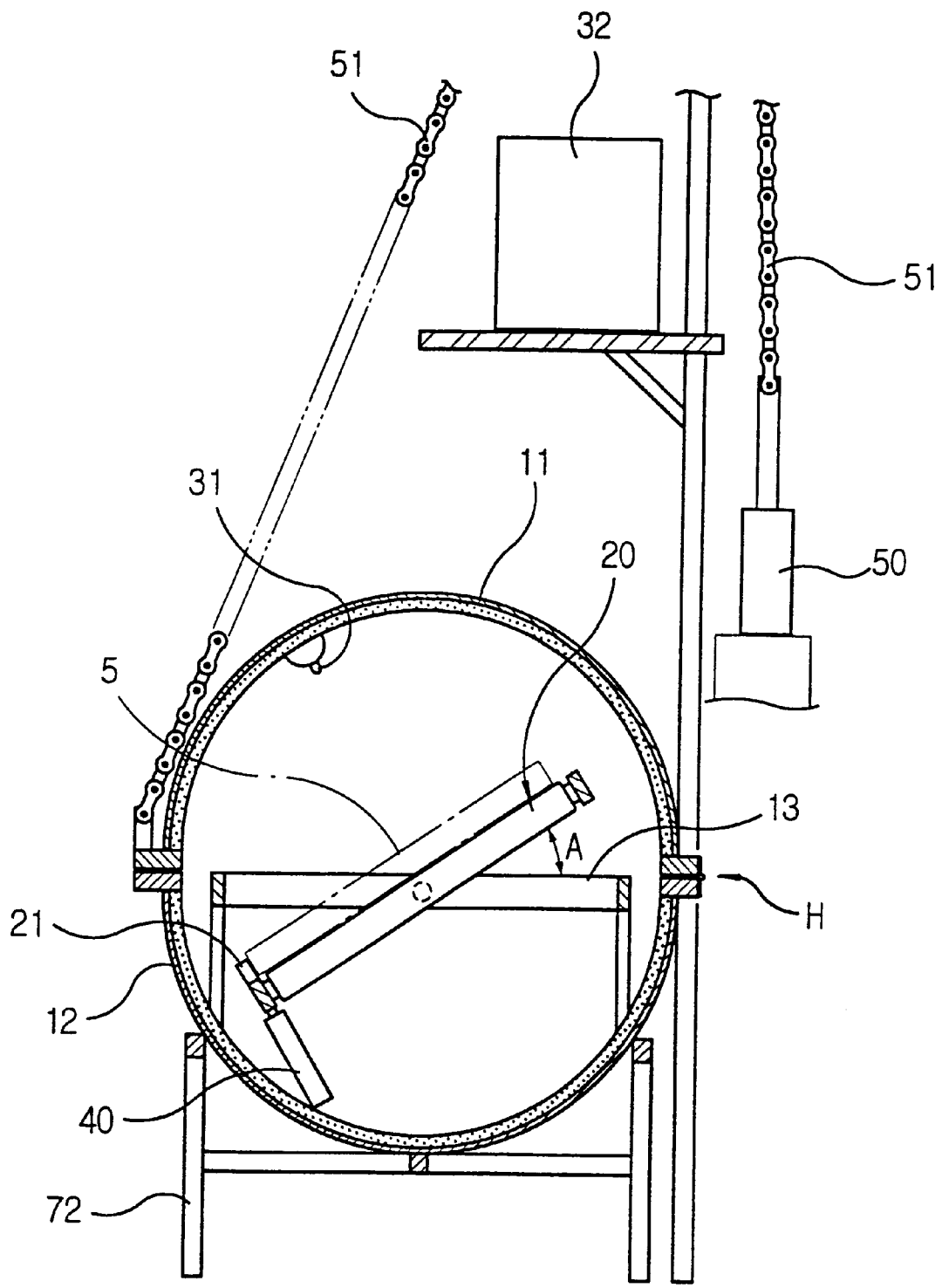
FIG. 3 is a sectional view of FIG. 2.
Figure 4:
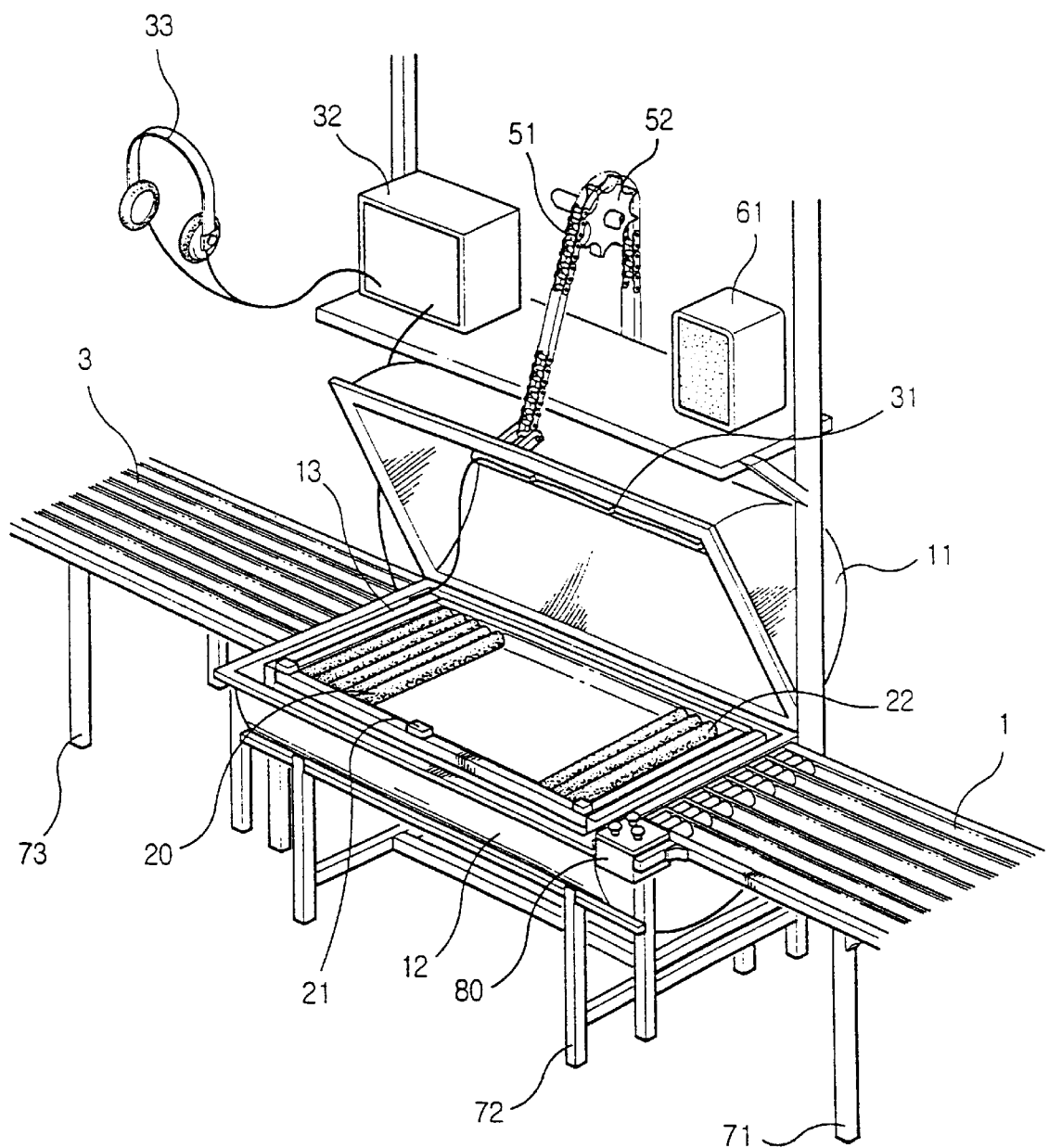
FIG. 4 is a perspective view showing a noise tester according to the present invention, wherein the cover is open.
Figure 5:
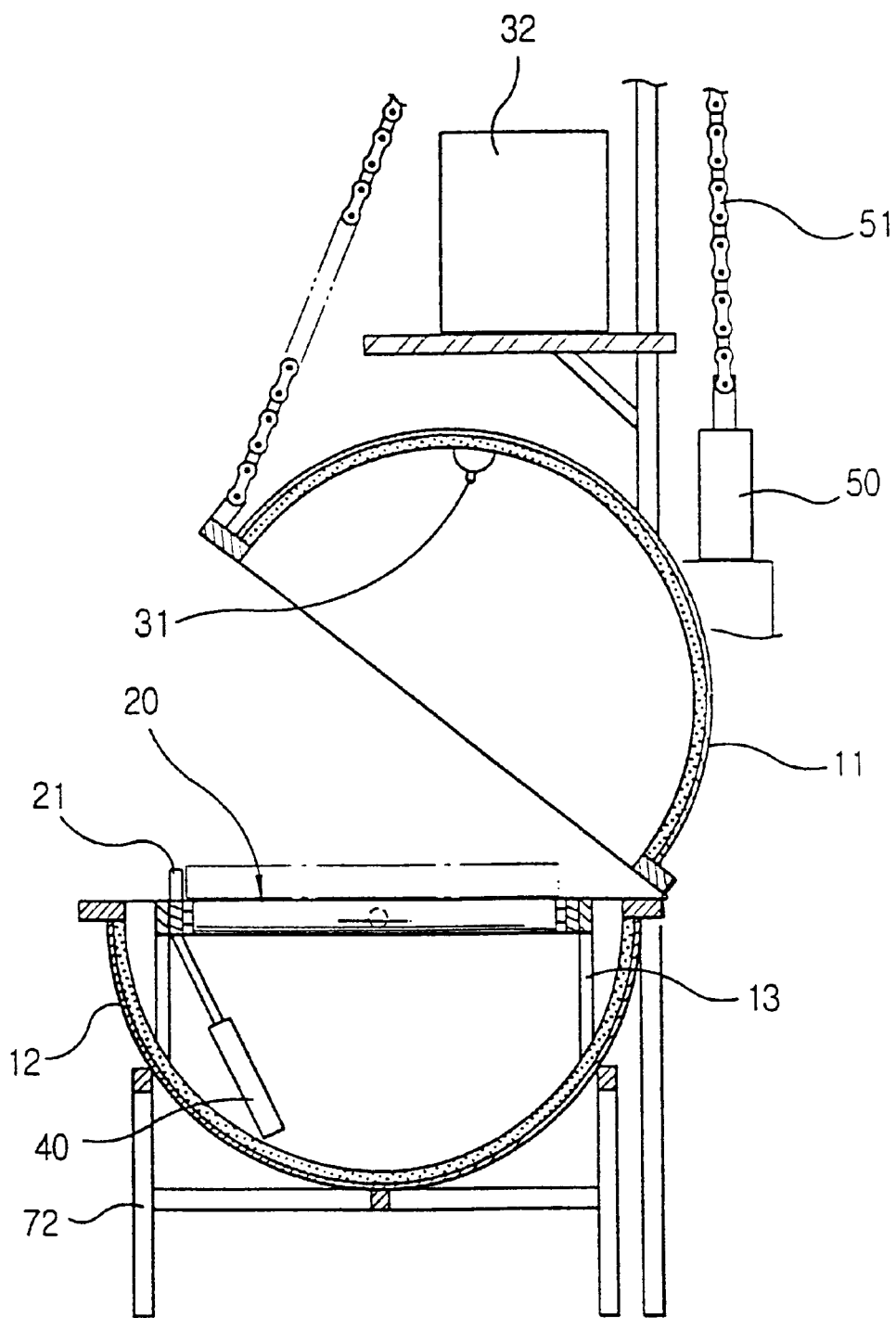
FIG. 5 is a sectional view of FIG. 4.

FIGS. 2 through 5 show a preferred embodiment of a noise tester of an indoor unit of a dual-unit type air conditioner according to the present invention.

Reference numeral 10 in the figures denotes a casing which is installed between an assembly line 1 and a packing line 3. The casing 10 is comprised of a lower body 12 and an upper cover 11 which are pivotably coupled with each other by a hinge H. The cover 11 opens/closes the body 12. The uppermost portion of the body 12 is not higher than the assembly line 1 and the packing line 3. The casing 10 is made of a soundproof material such as a bulletproof acrylic disposed between layers of sound-absorbing material.

A chain 51 is connected to a side of the cover 11 opposite to the hinge H. The chain 51 is connected to a first actuator 50 through a pulley 52 installed over the cover 11. The first actuator 50 opens/closes the cover 11. More specifically, as the first actuator 50 operates so as to pull the chain 51, the cover 11 is opened.

The casing 10 has a receiving part 20 installed therein. The receiving part 20 receives the indoor unit conveyed from the assembly line 1. The receiving part 20 is comprised of a roller conveyor for conveying the indoor unit from the assembly line 1 to the packing line 3. The receiving part 20 is about the same height as the conveyors of the assembly line 1 and the packing line 3. Thus, the indoor unit received onto the receiving part 20 is smoothly conveyed to the packing line 3.

Albeit not shown, the receiving part 20 includes a driving motor for rotating the rollers of the roller conveyor, and a position detecting sensor for detecting where the indoor unit is positioned or a stopper for stopping the same.

The receiving part 20 is pivotably coupled with a support part 1 3 installed on the body 12 of the casing 10 so that the receiving part 20 can be inclined to an angle oriented obliquely relative to horizontal. Supporting projections 21 are disposed at a side of the receiving part 20. The supporting projections 21 support the indoor unit 5 on the receiving part 20 when the receiving part 20 is inclined so that the indoor unit 5 does not fall down. The receiving part 20 is also connected with a second actuator 40 for inclining the receiving part 20.

The second actuator 40 is disposed below and connected with the receiving part 20 so as to pull a near side of the receiving part 20 downward. Alternatively, the second actuator 40 could be connected to the receiving part 20 so that it pushes a far side of the receiving part 20 upward, or it could be disposed above the receiving part 20. However, the latter situation would require more space for installation, because the cover 11 of the casing 10 would have to be larger to include the actuator. Thus, it is preferable that the second actuator 40 is installed below the receiving part 20 and pulls the near side thereof 20 downward.

The noise testing section performs the noise test of the indoor unit 5. The noise testing section is comprised of a microphone 31, an amplifier 32, and a headphone 33. The microphone 31 is installed inside of the casing 10 and senses the noise of the indoor unit 5. The amplifier 32 outside the casing 10 is connected with the microphone 31, and the headphone 33 is connected with the amplifier 32.

Alternatively, the noise testing section could be comprised of a microphone 31, and a microcomputer. The microphone 31 could be installed inside of the casing 10, and the microcomputer could be operable to rate the level of noise transmitted through the microphone 31. An indicating section (not shown) may be provided at the noise testing section so as to indicate the result produced from the microcomputer. The indication section could be a lamp or a speaker, and if a lamp is adopted as the indication section, it is positioned in such a place that the examiner outside the casing 10 can observe it easily.

Meanwhile, a withstand voltage testing section (not shown) is installed inside of the casing 10. The withstand voltage testing section performs a withstand voltage test of fully assembled indoor unit. The withstand voltage testing section is constructed in a similar manner to other conventional withstand voltage testing sections, except for the fact that it is installed inside of the casing 10. Thus, further description thereof is omitted. The unique aspect of the withstand voltage testing section according to the present invention is the fact that an indication device 61 thereof is installed outside of the casing 10. The indication section 61 could be a lamp, or a speaker.

Reference numerals 71, 72, and 73 in the drawings designate supporters for supporting respectively the assembly line 1, the casing 10, and the packing line 3. Reference numeral 80 designates operation switches.

The noise tester according to the preferred embodiment of the present invention constructed as described above performs a noise test of the indoor unit of a dual-unit type air conditioner as follows.

First, before the testing is performed, the cover 11 of the casing 10 is opened by the first actuator 50 which pulls the chain 51. In this situation, as the fully assembled indoor unit 5 is conveyed to the noise tester along the conveyor, the rollers 22 of the receiving part 20 rotated so that the indoor unit 5 is conveyed to the receiving part 20 from the assembly line 1.

As the position detecting sensor installed at a side of the receiving part 20 detects the position of the indoor unit 5 and determines that the same is completely conveyed to the receiving part 20, the rollers 22 of the receiving part 20 are stopped. Alternatively, the indoor unit 5 may be stopped by a stopper if a stopper is provided.

Then, electrical power is applied to the indoor unit 5 so that the withstand voltage testing section performs the withstand voltage test. If something unwanted is detected during the withstand voltage testing process, then the indication section 61 operates to indicate the rejection of the indoor unit to the examiner.

If the withstand voltage test uncovers nothing wrong with the indoor unit, then as the next step in the process, the examiner checks the appearance and operation thereof.

After that, the first actuator 50 operates to release the chain 51 so that the cover 11 of the casing 10 is closed.

After the cover 11 is closed, the second actuator 40 installed beneath the receiving part 20 operates to incline the receiving part 20 at an angle A of from forty to sixty degrees, preferably fifty degrees. As the receiving part 20 is inclined, the indoor unit 5 thereon is inclined together therewith. Accordingly, the indoor unit 5 is placed in an orientation similar to how it will be used, so the noise test is more precise. Meanwhile, when the indoor unit 5 is inclined, the support projections 21 prevent the indoor unit 5 from falling off the receiving part 20.

In this situation, the noise test is performed by the noise testing section. More specifically, as the indoor unit 5 operates, the noise generated from the indoor unit 5 is transmitted through the microphone 31. The noise transmitted through the microphone 31 is amplified by the amplifier 32 installed outside the casing 10, and then is output through the headphone 33. The examiner wears the headphone 31 and determines whether the level of the noise from the indoor unit 5 is acceptable or not. As described, since the examiner wears the headphone to determine the acceptability of the noise of the indoor unit 5, he/she does not have to bend his/her body so as to get his/her ear closer to the indoor unit 5 to hear the noise thereof. A speaker may be used instead of the headphone, however, in such case, there is a possibility that the examiner will not be able to clearly distinguish the noise of the indoor unit from other noises generated from other devices, such as the assembly line 1, the packing line 3, or the like.

Meanwhile, if the noise testing section is comprised of a microphone, a microcomputer, and an indication section, the noise transmitted through the microphone is input to the microcomputer. The microcomputer then rates the level of noise transmitted from the microphone, and determines whether the noise is acceptable or not. If it is determined as unacceptable, electrical power is applied to the indication section to indicate the result thereof. The indication section of the noise testing section could also be used as the indication section 61 of the voltage withstand testing section.

After the indoor unit undergoes all the above processes, the second actuator 40 returns the receiving part 20 to the horizontal orientation. Then, the first actuator 50 pulls the chain 51 to open the cover 11. As the rollers 22 of the receiving part 20 begin to rotate again, the indoor unit 5 on the receiving part 20 is conveyed from the casing 10 to the conveyor of the packing line 3.

According to the present invention, since the noise tester has a shape of a box installed on the assembly line, the size thereof is small. Also, since the withstand voltage testing process is simultaneously performed as a joint process of the noise testing process, the noise tester according to the present invention occupies a small installation space. Accordingly, the noise tester according to the present invention is suitable for a small-sized assembly line for producing a variety of products in small quantities.

In addition, since the examiner does not have to bend his/her body to perform the noise test, fatigue is reduced, and working efficiency increases. Furthermore, since the indoor unit is inclined during the testing process as if it were being used under normal working conditions, the test results are more precise, and thus more reliable.

While the present invention has been particularly shown and described with reference to the preferred embodiment thereof, it will be understood by those skilled in the art that various changes in form and details may be effected therein without departing from the spirit and scope of the invention as defined by the appended claims.

What is claimed is:

1. A noise tester for testing an operating noise level of an indoor air conditioner unit, comprising;
   a casing installed between an assembly line for assembling indoor air conditioner units and a packing line for packing the assembled units, the casing including a bottom section and a cover removably mounted on the bottom section for being raised to open the casing and permit a unit to be introduced therein;
   a receiving part disposed in the bottom portion for receiving a unit from the assembly line when the cover is open, and for transferring the unit to the packing line; and
   a test mechanism for testing an operating noise level of a unit disposed in the casing with the cover closed.

2. The noise tester as claimed in claim 1, wherein the casing is made of a soundproof material.

3. The noise tester according to claim 1, wherein the test mechanism includes a microphone arranged to detect an operating noise level of a unit-disposed in the casing with the cover closed.

4. The noise tester as claimed in claim 3, wherein the test mechanism further includes a headphone connected to the microphone for transmitting noise sensed by said microphone to an examiner located outside of the casing.

5. The noise tester as claimed in claim 4, wherein the test mechanism further includes an amplifier for amplifying the noise sensed by said microphone, the headphone being connected with the amplifier.

6. The noise tester as claimed in claim 3, wherein the test mechanism further includes a microcomputer connected to the microphone for rating a level of noise sensed by the microphone, and an indicator connected to the microcomputer for indicating a result produced from said microcomputer.

7. The noise tester as claimed in claim 6, wherein the indicator comprises an indicating lamp.

8. The noise tester as claimed in claim 6, wherein the indicator comprises an audio speaker.

9. The noise tester as claimed in claim 1, further comprising an opening/closing mechanism connected to the cover for opening/closing the cover.

10. The noise tester as claimed in claim 1, wherein the receiving part comprises a roller conveyer.

11. The noise tester as claimed in claim 1, wherein the receiving part is inclinable for inclining the indoor unit to an acute angle relative to horizontal.

12. The noise tester as claimed in claim 11, further including an actuator connected to the receiving part for inclining the receiving part.

13. The noise tester as claimed in claim 11, wherein the acute angle is from forty to sixty degrees.

14. The noise tester as claimed in claim 1, further comprising a withstand voltage test mechanism disposed in the casing for testing a withstand voltage of a unit disposed in the casing.

* * * * *